United States Patent [19]

Müller et al.

[11] Patent Number: 5,064,885

[45] Date of Patent: Nov. 12, 1991

[54] STABILIZED ALIPHATIC POLYCARBONATES

[75] Inventors: Friedemann Müller, Neuss; Edgar Leitz; Herbert Eichenauer, both of Dormagen; Karl-Heinz Ott, Leverkusen; Hans-Josef Buysch, Krefeld, all of Fed. Rep. of Germany

[73] Assignee: Bayer Aktiengesellschaft, Bayerwerk, Fed. Rep. of Germany

[21] Appl. No.: 655,204

[22] Filed: Feb. 11, 1991

Related U.S. Application Data

[63] Continuation of Ser. No. 494,865, Mar. 14, 1990, abandoned, which is a continuation of Ser. No. 192,722, May 11, 1988, abandoned.

[30] Foreign Application Priority Data

| May 23, 1987 | [DE] | Fed. Rep. of Germany | 3717451 |
| May 23, 1987 | [DE] | Fed. Rep. of Germany | 3717452 |
| May 23, 1987 | [DE] | Fed. Rep. of Germany | 3717453 |

[51] Int. Cl.$^5$ ............................................. C08K 5/527
[52] U.S. Cl. ..................................... 524/117; 524/119; 524/373; 528/372
[58] Field of Search ................. 524/117, 119, 373; 528/372

[56] References Cited

U.S. PATENT DOCUMENTS

| 3,042,653 | 7/1962 | Jibben | 524/611 |
| 3,053,878 | 9/1962 | Friedman et al. | 524/120 |
| 3,177,179 | 4/1965 | Lee et al. | 528/198 |
| 3,305,520 | 2/1967 | Fritz et al. | 524/151 |
| 3,622,612 | 11/1971 | Muller | 528/370 |
| 3,702,878 | 11/1972 | Saito | 524/119 |
| 4,066,630 | 1/1978 | Dixon et al. | 528/370 |
| 4,104,264 | 8/1978 | Dixon et al. | 528/370 |
| 4,145,525 | 3/1979 | Dixon et al. | 528/370 |
| 4,252,750 | 2/1981 | Buysch et al. | 524/117 |
| 4,276,232 | 6/1981 | Rasberger | 524/117 |
| 4,276,233 | 6/1981 | Markezich et al. | 524/611 |
| 4,303,759 | 12/1981 | Dixon et al. | 524/611 |
| 4,381,358 | 4/1983 | Rosenquist | 524/114 |
| 4,461,567 | 4/1987 | Tyrell et al. | 525/468 |

FOREIGN PATENT DOCUMENTS

| 0023291 | 7/1980 | European Pat. Off. . |
| 56-50956 | 5/1981 | Japan . |
| 61-151263 | 7/1986 | Japan . |
| 61-151264 | 7/1986 | Japan . |

OTHER PUBLICATIONS

CA 106:68332x (1987).
Patent Abstracts of Japan, vol. 5, No. 111 (1981).
T. J. Henman, "Melt Stabilization of Polypropylene", *Developments in Polymer Stabilization-1*, 39, 78–82, Gerald Scott (1979).
Chemical Abstract, vol. 106: 68332x, 1987.
Patent Abstracts of Japan, vol. 5, No. 111 (1981).

*Primary Examiner*—Veronica P. Hoke
*Attorney, Agent, or Firm*—Connolly & Hutz

[57] ABSTRACT

This invention relates to aliphatic polycarbonates including sequential copolymers based on cyclic aliphatic carbonates and esters and block copolymers of blocks of polymerised cyclic aliphatic carbonates and blocks of polymerised vinyl compounds stabilized against thermal degradation containing 0.01 to 3.0% by weight, based on polymer, of a compound of trivalent phosphorus.

5 Claims, No Drawings

STABILIZED ALIPHATIC POLYCARBONATES

This application is a continuation of application Ser. No. 07/494,865, filed 3/14/90 now abandoned which is a continuation of Ser. No. 192,722 filed 5/11/88 now abandoned.

This invention relates to aliphatic polycarbonates including sequential copolymers based on cyclic aliphatic carbonates and esters and block copolymers of blocks of polymerised cyclic aliphatic carbonates and blocks of polymerised vinyl compounds stabilized with compounds of trivalent phosphorus.

In contrast to aromatic polycarbonates, aliphatic polycarbonates show low thermal stability and, even at temperatures of only about 200° C., undergo a reduction in molecular weight in which the "back-biting" reactions of the free hydroxyl groups are said to play a significant part [S. Inoue, T. Tsuruta, Appl. Polym. Sym. 26, 257–67 (1975) and D. D. Dixon et al, J. Polym, Sci., Lett. Ed. 18, 131–34 1980)]. They are therefore unsuitable for applications which presuppose thermal stability. Nor can they be processed in practice by injection molding or extrusion.

Accordingly, aliphatic polycarbonates, unlike aromatic polycarbonates, have hitherto acquired no technical significance.

According to U.S. Pat. Nos. 4,066,630; 4,066,640; 4,104,264 and 4,145,525, the chain is "closed" by reaction of the free hydroxyl groups with suitable reagents, such as hydroxyl-reactive sulfur compounds, hydroxyl-reactive phosphorus compounds, acid anhydrides, acid chlorides or isocyanates. Back-biting reactions are largely suppressed in this way. However, the terminal blocking of the polymer does not in itself provide adequate thermal stability for technical handling because thermal degradation recurs through cleavage of the chain.

Sequential copolymers of cyclic, aliphatic carbonates and esters resemble elastic thermoplastic or thermoplastic elastomers in their properties, depending on their structure, their synthesis and their chemical composition.

The properties of these copolymers are determined by the polymerized monomers themselves, the ratios in which they are mixed, the sequence lengths and the sequence length distributions. Crystalline or amorphous and brittle or tough copolymers can be obtained by variation of these parameters.

For practical application, polymers of the type in question have to satisfy a number of requirements. For example, they have to be stable at relatively high processing temperatures so that they may be processed, for example, by injection molding, extrusion or calendering. The thermal stability of a polymer is determined not only by its basic chemical structure, but also by the number of its chemical and structural faults, by structures and terminal groups increasing the stability of the polymer, the molecular weight distribution and its chemical heterogeneity.

The thermal stability of sequential copolymers of cyclic aliphatic carbonates and esters is also determined by the stability of the aliphatic carbonate sequences and ester sequences.

In contrast to aromatic polycarbonates, aliphatic polycarbonates, even as carbonate sequences in copolymers, are degraded even at temperatures of only about 200° C. (S. Inoue, T. Tsuruta, Appl. Polym. Syn. 26, 257–67 (1975), D. D. Dixon et al. J. Polymer Sci, Lett. Ed. 18, 131–34 (1980)).

The thermal stability of polyesters of cyclic, aliphatic esters depends upon the structure of monomers. Degradation is observed even at temperatures of only 170° to 230° C. (K. C. Frisch, S. L. Reegan "Ring-Opening Polymerization" Marcel Dekker Inc. (1969)).

Sequential copolymers of cyclic, aliphatic carbonates and esters are therefore unsuitable for applications requiring high thermal stability of the materials involved.

Block copolymers of blocks of polymerised cyclic, aliphatic carbonates and blocks of polymerised vinyl compounds range in their properties from those of elastic thermoplasts to those of thermoplastic elastomers, depending on their structure, synthesis and chemical composition.

For practical application, they must fulfill numerous requirements, e.g. they must be stable at relatively high processing temperatures so that they can be worked up, for example, by injection moulding, extrusion or calendering. The thermal stability of a polymer is determined not only by its basic chemical structure but also by the number of its chemical and structural defects, by structures which increase the stability of the polymer, by its end groups, its molecular weight distribution and its chemical heterogeneity.

The thermal stability of block copolymers also depends on the thermal stability of the polymer blocks contained therein.

Aliphatic polycarbonates both as such and as polymer blocks present in block copolymers of carbonates and vinyl compounds, have little thermal stability, in contrast to vinyl polymers. They tend to undergo molecular weight degradation at temperatures of only about 200° C., and this is considered to be to a large extent due to the "backbiting" reactions of the free hydroxyl groups (see D. D. Dixon et al, J. Polym. Sci. Lett. Ed. 18, 131–134 (1980)). According to U.S. Pat. Nos. 4,066,630, 4,066,640, 4,104,264 and 4,145,525, the chain can be "closed" by the reaction of the free hydroxyl groups with, for example, hydroxyl reactive sulphur compounds, hydroxyl reactive phosphorus compounds, acid anhydrides, acid chlorides or isocyanates. The thermal stability of the polymers is thereby improved.

It has been found that the thermal degradation of aliphatic polycarbonates and sequentially structured copolymers thereof can be largely avoided by addition of 0.01 to 3.0% by weight, preferably 0.05 to 2.0% by weight and more preferably 0.2 to 1.8% by weight, based on aliphatic polycarbonate, of a compound of trivalent phosphorus.

The increase in the stability of the aliphatic polycarbonates achieved with compounds of trivalent phosphorus is far greater than that of aromatic polycarbonates and polycarbonate mixtures (cf. EP 0 023 291). The thermal stability and processing scope of aliphatic polycarbonates is thus improved to such an extent that even processing techniques involving thermal stressing, such as injection molding or extrusion, may be applied. The term aliphatic polycarbonates is here used to include block or sequential copolymers with esters and with polymerised vinyl compounds.

To avoid oxidative thermal degradation, the compounds of trivalent phosphorus may be combined with known antioxidants, such as sterically hindered phenols, in quantities of 0.05 to 3.0% by weight. For suitable anti-oxidants, see Ullmanns Encyklopädie der technischen Chemie, Vol. 8, p. 19, Verlag Chemie, Weinheim, Bergstrasse.

According to the invention, suitable compounds of trivalent phosphorus are phosphites corresponding to the following general formula

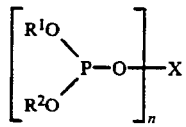
(I)

in which
- X is hydrogen, an optionally substituted aliphatic, cycloaliphatic or aromatic $C_1$-$C_{18}$ radical or a $C_7$-$C_{24}$ alkaryl or aralkyl radical which may also contain olefinic double bonds and hetero atoms (preferably O, S and non-basic nitrogens),
- n is an integer of 1 to 4, preferably 1 to 2, according to the valency of X,
- $R^1$ and $R^2$ independently of one another are $C_1$-$C_{18}$ alkyl, $C_5$-$C_{15}$ cycloalkyl, $C_7$-$C_{24}$ aralkyl or alkaryl or $C_6$-$C_{24}$ aryl,
- $R^1$ and X together represent an optionally substituted $C_2$-$C_4$ alkylene chain,
- $R^1$, $R^2$ and X together represent a straight-chain or branched $C_1$-$C_9$ alkyl or $C_5$-$C_7$ cycloalkyl radical which may be substituted by 3 to 6-membered cyclic radicals containing O and S as hetero atoms.

Phosphites such as these are described in EP 023 291.

Preferred stabilizers of formula I are those in which X is an aromatic radical, preferably substituted by $C_1$-$C_9$ alkyl radicals and $R^1$ and $R^2$ are aromatic radicals, preferably substituted by $C_1$-$C_9$ alkyl radicals in the o- and/or p-position to the ester bond.

Compounds of the formula I in which n=1 and $R_1$=$R_2$=X=aromatic radical substituted by $C_9$ alkyl are particularly preferred.

Other suitable phosphites are those corresponding to the following general formula

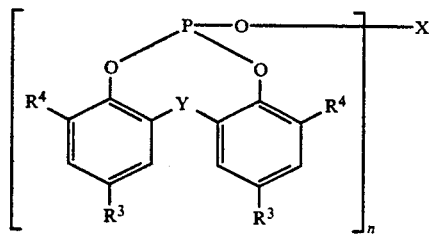
(II)

in which
- X and n are as defined above,
- $R^3$ and $R^4$ may be the same or differnt and represent $C_1$-$C_9$ aliphatic, $C_5$-$C_6$ cycloaliphatic and $C_7$-$C_9$ aralkyl or $C_6$-$C_{10}$ aryl radicals,
- Y is S or

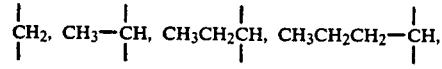

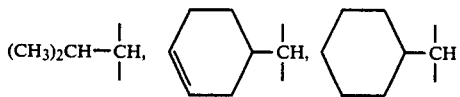

where $R^5$=H, $C_1$-$C_6$ alkyl, cyclohexenyl or cyclohexyl.

Particularly preferred compounds of formula (II) are those in which
- X is hydrogen,
- $R^3$ is a $C_1$-$C_9$ alkyl radical, a $C_5$-$C_6$ cycloalkyl radical, a $C_7$-$C_9$ aralkyl radical or a $C_6$-$C_{10}$ aryl radical,
- $R^4$ is a benzyl, α-methylbenzyl, α,α'-dimethylbenzyl, methyl, ethyl, isopropyl, tert.-butyl, tert.-amyl, isononyl, cyclopentyl or cyclohexyl radical and
- Y represents —S—,

These phosphites are described in EP 232 901.

Other stabilizers suitable for use in accordance with the invention are phosphites of formulae III–IIIe below (cf. DE-OS 2 034 887):

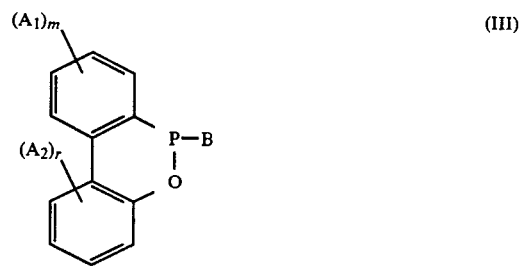
(III)

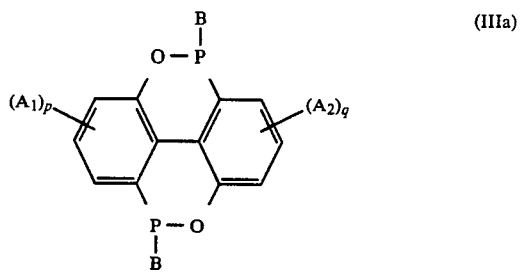
(IIIa)

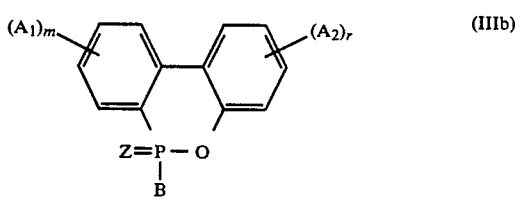
(IIIb)

(IIIc)

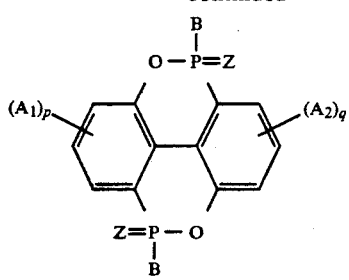

(IIId)

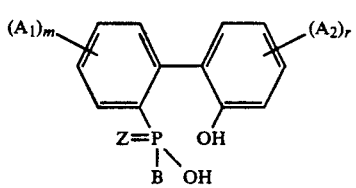

(IIIe)

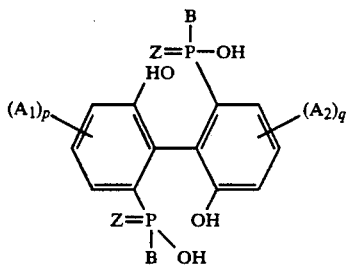

in which B is hydrogen, hydroxyl, halogen, $C_1-C_{22}$ alkyl, $C_1-C_{22}$ alkoxy, $C_1-C_{22}$ alkylthio, aryloxy or arylthio, $A_1$ and $A_2$, which may be the same or different, represent hydrogen, halogen, $C_1-C_{18}$ alkyl, $C_1-C_{18}$ alkyloxy, aryl, aryloxy, acyl, cyano, in addition to which $A_1$ and $A_2$ together with the biphenyl ring may also form a phenanthrene ring, Z is oxygen or sulfur, m and r are integers of 0 to 4 and p and q are integers of 0 to 3.

The systematic names of these organophosphorus compounds are very complicated. They have the following structural formulae for example:

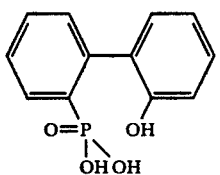

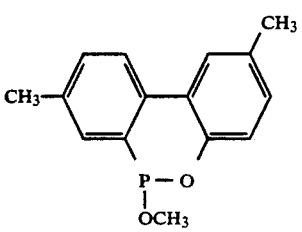

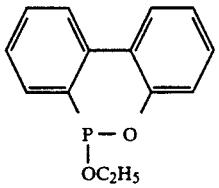

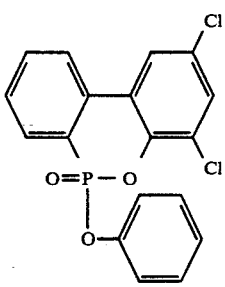

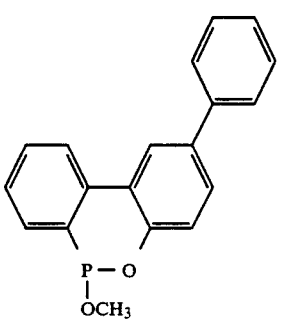

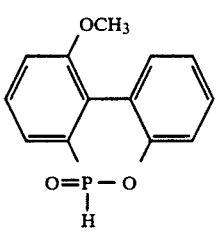

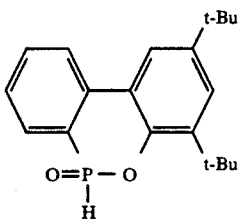

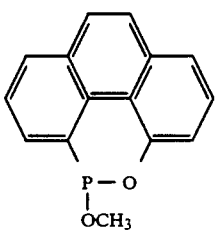

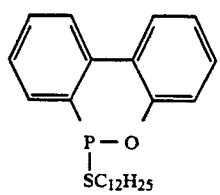
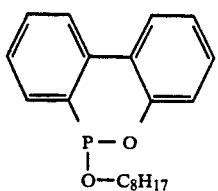
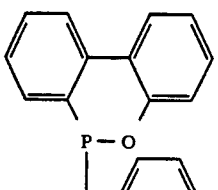
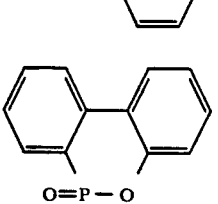
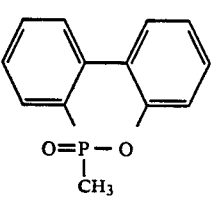
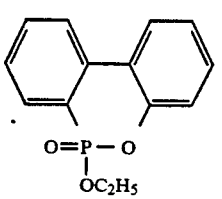
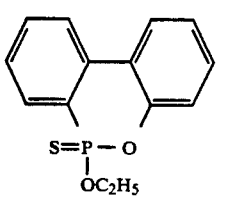
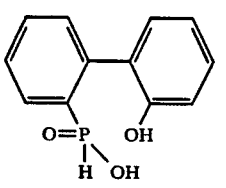

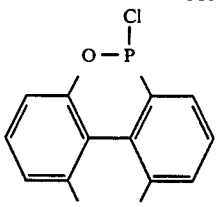
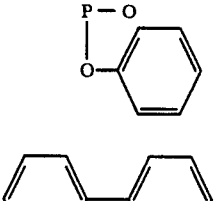
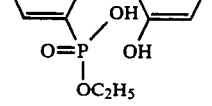
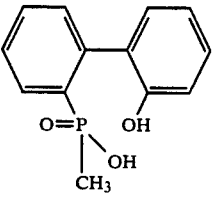

preference being attributed to those in which B is H, OH, $C_1$–$C_{18}$ alkyl, $C_1$–$C_{18}$ alkoxy, aryloxy, arylthio, $A_1$ and $A_2$ are H, $C_1$–$C_9$ alkyl, $C_1$–$C_9$ alkoxy, aryl, aryloxy,

Z=0, m and r=0, 1, 2 p and q=0, 1, 2, greater preference being attributed to those in which

B is H, OH, $C_1$–$C_4$ alkyl, $C_1$–$C_4$ alkoxy, aryloxy, $A_1$ and $A_2$ are H, $C_1$–$C_4$ alkyl,

Z=0, m and r=0, 1 p and q=0, 1.

Other stabilizers suitable for use in accordance with the invention are phosphites corresponding to formula (IV) which may be obtained from pentaerythritol, perhydrobisphenol A, monoalcohols and phosphorous acid esters. They are prepared by transesterification of the components trialkyl or triphenyl phosphite, pentaerythritol, perhydrobisphenol and, optionally, a monoalcohol in the necessary molar ratios and removal of the alcohol from the trialkyl phosphite or the phenol from the triphenyl phosphite from the equilibrium by distillation, optionally in vacuo, up to a sump temperature of at most 200° C.

Pentaerythritol is best first reacted with the phosphite with removal by distillation of a first fraction of approximately 2 moles hydroxy compound per mole phosphite, after which perhydrobisphenol A is added and more hydroxy compound distilled off during the reaction to a sump temperature of preferably 180° C. and more preferably 170° C.

Where a $C_6$–$C_{18}$ monoalcohol is to be used, it is preferably added after the second fraction of the hydroxy compound has been distilled off. After addition of this monoalcohol, a third fraction of the hydroxy compound is removed from the phosphite originally used by distillation, optionally in vacuo, up to a sump temperature of preferably 180° and more preferably 170° C.

It is particularly necessary to work in a vacuum where triphenyl phosphite is used or where the last traces of a lower alcohol are to be removed from the reaction mixture during the final phase of the transesterification.

The components mentioned are reacted with one another in the following molar ratios:

| Components | In general | Better | Preferred | More preferred |
|---|---|---|---|---|
| Perhydrobisphenol A | 1 | 1 | 1 | 1 |
| Pentaerythritol | 0.5–2.0 | 0.66–1.5 | 0.75–1.3 | 0.80–1.2 |
| Phosphite | 1.3–4.0 | 1.5–3.5 | 1.6–3.2 | 1.7–2.8 |
| Monoalcohol | 0–1.5 | 0–1.0 | 0–0.5 | 0–0.3 |

Suitable phosphites are triphenyl phosphite, preferably trialkyl phosphites of $C_1$–$C_4$ alcohols, more preferably trimethyl and triethyl phosphite.

Suitable monoalcohols are aliphatic $C_6$–$C_{18}$ alcohols, preferably primary alcohols, of which isooctanol, decanol, dodecanol, tetradecanol and octadecanol are mentioned as examples.

The compounds formed during this synthesis by transesterification are not of course individual compounds, but rather mixtures of oligomeric phosphites to which the following formula may largely be assigned:

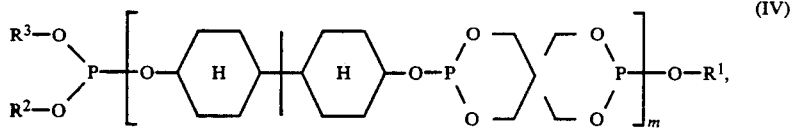

(IV)

in which $R^1$, $R^2$ and $R^3$ may be the same or different and represent $C_1$–$C_{18}$ alkyl, aryl, a radical of the following formula

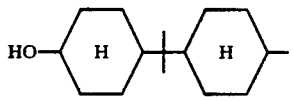

(V)

in addition to which $R^1$ may be a radical of the following formula

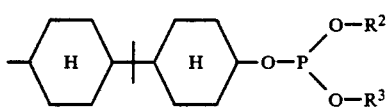

(VI)

$R^2$ and $R^3$ may also be a radical of the following formula

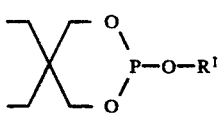

(VIII)

and m is an integer of 1 to 20.

$R^1$, $R^2$ and $R^3$ preferably represent methyl, ethyl, propyl, butyl, isooctyl, decyl, dodecyl, tetradecyl, octadecyl, in addition to which $R^1$ may represent the radical V and VI and $R^2$ and $R^3$ together may represent the radical VII, m=2–15. $R^1$, $R^2$ and $R^3$ are more preferably methyl, ethyl, octadecyl (stearyl), in addition to which $R^1$ may be the radical V and VI and $R^2$ and $R^3$ together may also represent the radical VII, m=2–10.

Stabilizers similar to those corresponding to formula IV are disclosed in U.S. Pat. No. 3,571,251.

These phosphites may also be used in accordance with the invention, X preferably being oxygen.

Accordingly, the present invention relates to aliphatic polycarbonates or mixtures of aliphatic polycarbonates stabilized against thermal degradation containing compounds of trivalent phosphorus in quantities 0.01 to 3.0% by weight, preferably in quantities of 0.2 to 1.8% by weight, based on aliphatic polycarbonates, optionally in combination with known anti-oxidants.

Aliphatic polycarbonates in the context of the invention are compounds corresponding to the following general formula

(VIII)

with n ≧ 20 in which

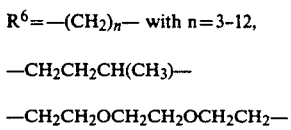

$R^6$=—$(CH_2)_n$— with n=3–12,

—$CH_2CH_2CH(CH_3)$—

—$CH_2CH_2OCH_2CH_2OCH_2CH_2$—

—$CH_2CH(CH_3)CH_2CH_2C(CH_3)_2CH_2$—

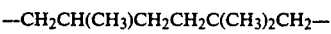

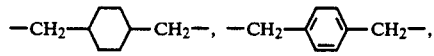

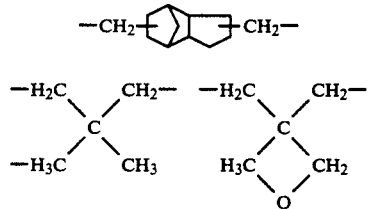

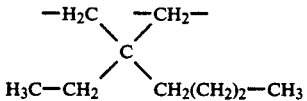

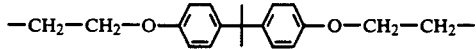

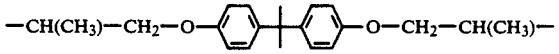

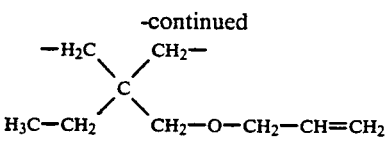

The aliphatic polycarbonates may be prepared by standard methods, for example by reaction or phosgenation of diols (DE-OS 20 01 091, FR-PS 13 91 512, DE-OS 10 31 512, DE-OS 24 46 107, DE-OS 26 05 024, EP 002, 641, DE-OS 24 47 349), better still by ring-opening mass and solution polymerization of cyclic aliphatic carbonates (DE-OS 15 45 116, 15 45 117, 31 03 135, 32 04 078).

The preferred production method is the anionic ring-opening solution polymerization of cyclic aliphatic carbonates at low temperatures c.f (DE-OS 36 07 625).

Cyclic aliphatic carbonates for the production of the polycarbonates according to the invention are compounds corresponding to the following formula

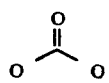

(IX)

in which $R^7 = -(CH_2)_n-$ with n=3-12, $-CH_2CH_2CH(CH_3)-$ $-CH_2CH_2OCH_2CH_2OCH_2CH_2-$ $-CH_2CH(CH_3)CH_2CH_2C(CH_3)_2CH_2-$

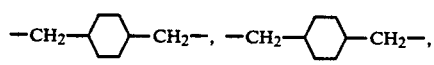

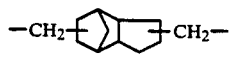

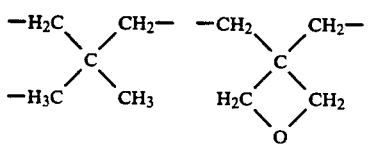

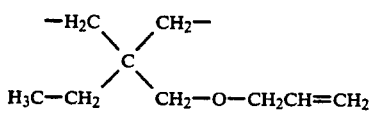

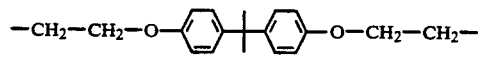

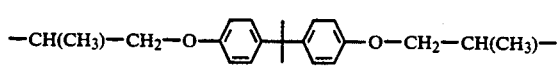

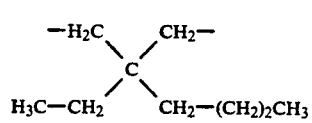

and compounds corresponding to the following formula X

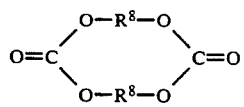

(X)

in which $R^8 = -(CH_2)_n-$ with n=4-12

$-CH_2CH_2OCH_2CH_2-$ $-CH_2CH_2OCH_2CH_2OCH_2CH_2-$.

Carbonates corresponding to formula IX are preferably used. The carbonate in which $R^7=$

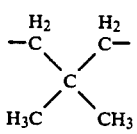

(IX)

is particularly preferred.

The polycarbonates may have molecular weights of 2000 g/mole to 500,000 g/mole and preferably of 5000 g/mole to 400 000 g/mole, and most preferably 5000 to 12 000 g/mole.

Suitable are also sequential polymers having the following idealized formula

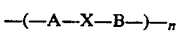

(XI)

with n=1 to 20, more especially 1 to 10, in which
—A—=a polymer of a cyclic carbonate corresponding to the formula X ("block A")
The carbonate corresponding to formula IX in wich R=

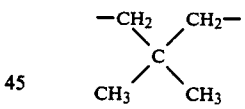

is most preferred.
—B—=a polymer of a cyclic ester having the following formula XII ("block B")

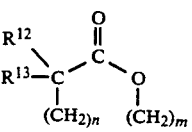

(XIV)

with
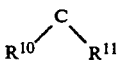
$R^{10}$, $R^{11}$, $R^{12}$, $R^{13}$=H, $C_1$-$C_6$ alkyl, $C_3$-$C_6$ alkenyl, $C_1$-$C_6$ alkoxy, $C_1$-$C_6$ alkenoxy-$C_1$-$C_6$-alkyl, more especially H, $CH_3$, $C_2H_5$, wherein m, n independently of one another have the value 0, 1, 2, 3, 4, 5 or 6 and in which X is the central section containing both the cyclic carbonate of formula IX and/or X and also the cyclic ester of formula XII in polymerized form, the concentration of the radicals IX and/or X decreasing continuously in the direction of —B— and the concentration of the radicals XII decreasing continuously in the direction of —A— ("tapered structure").

Particularly preferred cyclic carbonates (IX) and (X) are trimethylene glycol carbonate, neopentyl glycol carbonate, 1,4-butanediol carbonate and dimeric carbonates of pentanediol or hexanediol.

Preferred lactones (XII) are ε-caprolactone and pivalolactone.

In the polymers according to the invention, the average molecular weights of the blocks A and B and of the central sections X may be different or substantially the same.

The polymers contain the blocks A and B in quantities of 5 to 95% by weight (based on the total quantity of A+B), but preferably in quantities of 5 to 20% by weight A and 95 to 80% by weight B (based on A+B) and 5 to 20% by weight B and 95 to 10% by weight A (based on A+B); the content of middle sections X of tapered structure is 5 to 95% by weight (based on A+B+X) and preferably 20 to 80% by weight (based on A+B+X).

The copolymers may be prepared from the cyclic carbonates and esters by anionic ring-opening solution polymerization. A sequential structure of the copolymers is achieved by step-by-step addition of the carbonate/ester mixture to the polymerisation-active solution.

Suitable are further block copolymers corresponding to the following idealized formula XIII:

A-B-A; B-A-B or (A-B)$_x$     (XIII)

wherein
x=1 to 20, in particular 1 to 10, and
A denotes the group of a homopolymer of styrene, vinyl naphthalene, isopropenylnaphthalene or butadiene-(1,3) or isoprene, in particular styrene or butadiene-(1,3), and
B denotes the group of a homopolymer of a cyclic aliphatic carbonate of general formula IX or of general formula X. Those of formula XII are preferred.

The carbonate corresponding to formula XIV is particularly preferred.

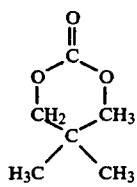
(XIV)

The average molecular weights of blocks A and B are above 800, preferably above 1000 and most preferably above 10,000.

In the block copolymers according to the invention, the average molecular weights of blocks A and B may be different or almost the same.

The block copolymers contain block A in quantities of from 5 to 95% by weight and block B in quantities of from 95 to 5% by weight but they preferably contain from 5 to 20% by weight of A and from 95 to 80% by weight of B or from 5 to 20% by weight of B and from 95 to 80% by weight of A, i.e. in the preferred block copolymers, either the weight of component A or the weight of component B predominates.

The block copolymers may be prepared by anionic polymerisation according to DE-OS 3 607 627. The stabilizers according to the invention and optionally antioxidants may be mixed into the polymers by known methods, e.g. in kneaders or extruders.

The method employed for processing the polymers depends on their properties. Polymers which have thermoplastic properties may be converted into moulded products in the same way as other thermoplasts.

The stabilizers according to the invention, optionally in conjunction with known antioxidants, may be added to the polymers by known methods, for example in kneaders or screw extruders. The stabilized polymers may be pigmented, antistatically finished and/or flameproofed and filled in known manner.

The stabilizers according to the invention, optionally in combination with known antioxidants, may be added to the copolymers in known manner, for example in kneaders or screw extruders.

The processing of the polymers is determined by their properties. For example, polymers having thermoplastic properties may be molded in the same way as thermoplasts.

The copolymers according to the invention are eminently suitable for the production of films, seals, coatings, particularly in cases where improved long-term behavior is required, and for the production of packs, particularly for foods.

The polymers according to the invention may be stabilized and pigmented in known manner and antistatically finished, made easier to process or flameproofed using standard additives or filled with fillers.

EXAMPLES I

Aliphatic Polycarbonates

The thermal degradation behavior of aliphatic polycarbonates was determined as follows:

2 g of the polymer were heated for 40 minutes to 210° to 270° C. in a test tube. The relative viscosity [$\eta_{rel}$] of the polymer was determined in a 2% by weight solution in methylene chloride and compared with the corresponding viscosity of an untreated sample.

Comparison with the viscosity of the unheated sample shows the particular degree of heat damage.

EXAMPLE 1

Preparation of the stabilizer of formula IV 36.6 g (0.27 mole) pentaerythritol and 89.6 g (0.54 mole) triethyl phosphite are reacted with one another, 44 g ethanol distilling off through a column under normal pressure up to a sump temperature of 170° C. 72 g (0.3 mole) perhydrobisphenol A are then added and another 20 g ethanol distilled off up to a sump temperature of 170° C. 130 g of a colorless brittle resin are obtained.

0.4% by weight of this phosphite compound and 0.2% by weight 2,6-di-tert.-butyl-4-methyl phenol were added to a polyneopentyl glycol carbonate having a relative viscosity $\eta_{rel}$ of 1.58. Thermal stability was determined as described above and compared with that of an unstabilized sample.

|                   | Stabilized | Unstabilized |
|-------------------|------------|--------------|
| Starting viscosity | $\eta_{rel} - 1$ | |
|                   | 0.58       |              |
| Temperature (°C.) |            |              |
| 210               | —          | 0.46         |
| 230               | —          | 0.38         |
| 250               | 0.58       | 0.05         |
| 270               | 0.42       | 0.08         |

EXAMPLE 2

0.4% by weight of the phosphite compound of Example 1 and 0.2% by weight 2,6-di-tert.-butyl-4-methyl phenol were added to a polyneopentylglycol carbonate of which the terminal hydroxyl groups are blocked with 1,3,5-benzenetricarboxylic acid chloride. Thermal stability was determined as described above and compared with that of an unstabilized sample.

|                   | Stabilized | Unstabilized |
|-------------------|------------|--------------|
| Starting viscosity | $\eta_{rel} - 1$ | |
|                   | 0.21       |              |
| Temperature (°C.) |            |              |
| 210               | 0.20       | 0.13         |
| 230               | 0.18       | 0.08         |
| 250               | 0.17       | —            |

EXAMPLE 3

A polyneopentylglycol carbonate having a relative viscosity $\eta_{rel}$ of 2.13 which had been obtained by anionic solution polymerization was prepared as follows:

2 ml n-butyl lithium (2.5 molar solution in hexane) were added under nitrogen at 0° C. to a solution of 350 g neopentylglycol carbonate in 3900 g toluene. The polymerization time at that temperature was 4 hours. The reaction mixture was then decomposed with 80 ml methanol/hydrochloric acid (9:1), precipitated in methanol, isolated by filtration and dried. The conversion was 93%.

The stabilizers 3a–3d below were added to the polyneopentylglycol carbonate. Thermal stability was determined as described above and compared with that of an unstabilized sample.

3a. 0.6% by weight tris-(nonylphenyl)-phosphite
3b. 0.4% by weight tris-(nonylphenyl)-phosphite and 0.2% by weight 2,6-di-tert.-butyl-methyl phenol
3c. 0.6% by weight phosphorus acid ester of bis-(2-hydroxy-3-cyclohexyl-5-methylphenyl)-methane
3d. 0.6% by weight phosphorus acid ester of bis-(2-hydroxy-3-tert.-butyl-5-methylphenyl)-methane

|                    | Stabilized |      |      |      |              |
|--------------------|------------|------|------|------|--------------|
| Starting viscosity | $\eta_{rel} - 1$ |  |  |  |              |
|                    | 1.13       |      |      |      |              |
| Example            | 3a         | 3b   | 3c   | 3d   | Unstabilized |
| Temperature (°C.)  |            |      |      |      |              |
| 210                | 1.13       | 1.10 | 1.12 | 1.13 | 0.50         |
| 230                | 1.13       | 1.06 | 1.06 | 1.11 | 0.29         |
| 250                | 1.08       | 1.00 | 0.98 | 1.09 | 0.17         |
| 270                | 0.85       | 0.84 | 0.77 | 0.82 | 0.11         |

EXAMPLES II

Sequential carbonate ester-copolymers

The thermal degradation behavior of sequential copolymers based on cyclic aliphatic carbonates and esters was determined as follows:

2 g of the polymer were heated for 40 minutes to 210° to 270° C. in a test tube. The relative viscosity ($\eta_{rel}$) of the polymer was determined on a 2% by weight solution in methylene chloride and compared with the corresponding viscosity of an untreated sample.

Comparison with the viscosity of the unheated sample shows the particular degree of heat damage.

EXAMPLE 1

Squential copolymer of neopentyl glycol carbonate (50 mole %) and ε-caprolactone (50 mole %)

6 ml n-butyl lithium (2.5 molar solution in hexane) were added under nitrogen at 0° C. to a solution of 260 g neopentyl glycol carbonate and 228 g ε-caprolactone in 5 l toluene. The polymerization time at that temperature was 6 hours. The reaction mixture was then decomposed with 80 ml methanol/hydrochloric acid (8:2), precipitated in methanol, isolated by filtration and dried. The conversion was 95%.

Stabilizers 1a–1c below were added to the sequential copolymers of neopentyl glycol carbonate and ε-caprolactone. The stability was determined as described above and compared with that of an unstabilized sample.

1a) 0.4% of the stabilizer obtained as described below and 0.2% by weight 2,6-di-tert.-butyl-4-methyl-phenol 36.6 g (0.27 mole) pentaerythritol and 89.6 g (0.5 mole) triethylphosphite are reacted with one another, 44 g ethanol distilling off through a column under normal pressure up to a sump temperature of 170° C. 72 g (0.3 mole) perhydrobisphenol A are then added and another 20 g ethanol distilled off up to a sump temperature of 170° C. 130 g of a colorless brittle resin are obtained.
1b) 0.6% by weight tris-(nonylphenyl)-phosphite
1c) 0.6% by weight phosphorus acid ester of bis-(2-hydroxy-3-tert.-butyl-5-methylphenyl)-methane.

|                    | Stabilized |      |      |              |
|--------------------|------------|------|------|--------------|
| Starting viscosity | $\eta_{rel} - 1$ |  |  |              |
|                    | 0.54       |      |      |              |
| Example            | 1a         | 1b   | 1c   | Unstabilized |
| Temperature (°C.)  |            |      |      |              |
| 210                | 0.51       | 0.54 | 0.52 | 0.46         |
| 230                | 0.41       | 0.55 | 0.50 | 0.44         |
| 250                | 0.42       | 0.45 | 0.46 | 0.37         |
| 270                | 0.35       | 0.37 | 0.42 | 0.20         |

EXAMPLE 2

Sequential copolymer of neopentyl glycol carbonate (70% by weight) and ε-caprolactone (30% by weight)

15 ml n-butyl lithium (2.5 molar solution in hexane) were added under nitrogen at 0° C. to a solution of 1050 g neopentyl glycol carbonate and 450 g ε-caprolactone in 10 l toluene. The polymerization time at that temperature was 5 h. The reaction mixture was then decomposed with 250 ml methanol/hydrochloric acid (8:2), precipitated in methanol, isolated by filtration and dried. The conversion was 96.7%.

Stabilizers 2a-2c below were added to the sequential copolymers of neopentyl glycol carbonate and ε-caprolactone. The thermal stability was determined as described above and compared with that of an unstabilized sample.

2a) 0.6% by weight tris-(nonylphenyl)-phosphite and 0.2% by weight 2,6-di-tert.-butyl-4-methylphenol
2b) 0.6% by weight phosphorus acid ester of bis-(2-hydroxy-3-tert.-butyl-5-methylphenyl)-methane and 0.2% by weight 2,6-di-tert.-butyl-4-methylphenol
2c) 0.6% by weight 2,6-di-tert.-butyl-4-methylphenol
2a) 0.6% by weight tris-(nonylphenyl)-phosphite and 0.2% by weight 2,6-di-tert.-butyl-4-methylphenol
2b) 0.6% by weight phosphorous acid ester of bis-(2-hydroxy-3-tert.-butyl-5-methylphenyl)-methane and 0.2% by weight 2,6-di-tert.-butyl-4-methylphenol
2c) 0.65 by weight phosphorous acid ester of bis-(2-hydroxy-3-cyclohexyl-5-methylphenyl)-methane acid and 0.2% by weight 2,6-di-tert.-butyl-4-methylphenol.

| Starting viscosity Example | Stabilized $\frac{\eta_{rel} - 1}{0.62}$ | | | Unstabilized |
|---|---|---|---|---|
| | 2a | 2b | 2c | |
| Temperature (°C.) | | | | |
| 210 | 0.61 | 0.61 | 0.60 | 0.63 |
| 230 | 0.58 | 0.60 | 0.58 | 0.50 |
| 250 | 0.55 | 0.59 | 0.58 | 0.48 |
| 270 | 0.47 | 0.49 | 0.49 | 0.15 |

Examples III

Sequential carbonate-vinyl compounds-copolymer

The thermal degradation of sequential copolymers based on cyclic carbonate and vinyl-compounds was determined as follows:

2 g of the polymer was heated to 210°-270° C. for 40 minutes in a test tube. The relative viscosity ($\eta_{rel}$) of this polymer was determined on a 2% by weight solution in methylene chloride and compared with the corresponding viscosity of an untreated sample.

The degree of thermal damage is obtained from a comparison of the viscosity with that of the unheated sample.

EXAMPLE 1

Polystyrene-block-polyneopentyl glycol carbonate ($\eta_{rel.}=1.49$)

0.6 ml of n-butyl lithium (2.5 molar solution in hexane) was added under nitrogen to a solution of 30 g of styrene in 535 ml of toluene at 40° C. The polymerisation time was 3 hours at this temperature.

The solution of polystyrol lithium was then cooled to room temperature and treated with ethylene oxide until it had decolourized. 28 g of neopentyl glycol carbonate were then added to the resulting lithium alcoholate solution and the solution was cooled to −10° C. After a polymerisation time of 4.5 hours at this temperature, the reaction mixture was decomposed with 5 ml of methanol/hydrochloric acid (8:2) and the reaction product was isolated by precipitation in methanol and dried. 100% conversion was obtained.

The stabilizers mentioned in 1a and 1b were added to the block copolymer of styrene and neopentyl glycol carbonate. The thermal stability was determined as described above and compared with that of an unstabilized sample.

1a. 0.6% of the stabilizer obtained by the method described below.

36.6 g (0.27 mol) of pentaerythritol and 89.6 g (0.54 mol) of triethylphosphite are reacted together and 44 g of ethanol distil off over a column at normal pressure until the sump temperature is 170° C. 72 g (0.3 mol) of perhydrobisphenol A are then added and a further 20 g of ethanol is distilled off down to a sump temperature of 170° C. 130 g of a colourless, brittle resin are obtained.

1b. 0.6% of the phosphorous acid ester of bis-(2-hydroxy-3-cyclohexyl-5-methyl-phenyl)methane

| Initial viscosity Example | Stabilized $\frac{\eta_{rel} - 1}{0.49}$ | | Unstabilized |
|---|---|---|---|
| | 1a | 1b | |
| Temperature (°C.) | | | |
| 210 | 0.48 | 0.45 | 0.23 |
| 230 | 0.46 | 0.47 | 0.12 |
| 250 | 0.42 | 0.30 | 0.12 |

EXAMPLE 2

Polystyrene block polyneopentyl glycol carbonate ($\eta_{rel.}=1.39$)

0.6 ml of n-butyl lithium (2.5 molar solution in hexane) were added under nitrogen to a solution of 27 g of styrene in 400 ml of toluene at 40° C. The polymerisation time was 3 hours at this temperature. The solution of polystyryl lithium was then adjusted to room temperature and treated with ethylene oxide until decolourized. 28 g of neopentyl glycol carbonate were added to the resulting lithium alcoholate solution and the solution was cooled to −10° C. After a polymerisation time of 4 hours at this temperature, 5 ml of methanol/hydrochloric acid (8:2) were added to the reaction mixture and the reaction product was isolated by precipitation in methanol and dried. 100% conversion was obtained.

The stabilizers indicated under 2a-2d were added to the block copolymer of styrene and neopentyl glycol carbonate. The thermal stability was determined as described above and compared with that of an unstabilized sample.

2a. 0.6% by weight of tris-(nonyl-phenyl) phosphite
2b. 0.6% by weight of the phosphite of Example 1a and 0.2% by weight of 2,6-di-tert.-butyl-4-methylphenol
2c. 0.6% by weight of phosphorous acid ester of bis-(2-hydroxy-3-cyclohexyl-5-methyl-phenyl)-methane and 0.2% by weight of 2,6-di-tert.-butyl-4-methylphenol
2d. 0.6% by weight of phosphorous acid ester of bis-(2-hydroxy-3-tert.-butyl-5-methyl-phenyl)-methane and 0.2% by weight of 2,6-di-tert.-butyl-4-methylphenol

| Initial viscosity Example | Stabilized $\frac{\eta_{rel} - 1}{0.39}$ | | | | Unstabilized |
|---|---|---|---|---|---|
| | 2a | 2b | 2c | 2d | |
| Temperature (°C.) | | | | | |
| 210 | 0.40 | 0.39 | 0.39 | 0.37 | 0.27 |
| 230 | 0.33 | 0.39 | 0.40 | 0.38 | 0.18 |
| 250 | 0.18 | 0.38 | 0.32 | 0.28 | 0.12 |

We claim:

1. Aliphatic polycarbonates stabilized against thermal degradation containing 0.2 to 1.8% by weight, based on polycarbonate, of a compound of trivalent phosphorus of the formula

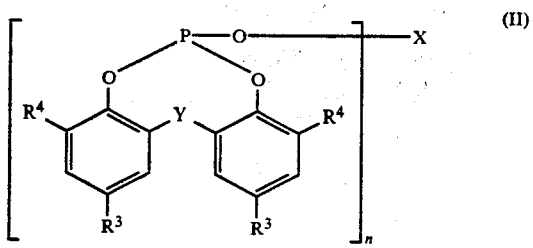

in which

X is hydrogen, an optionally substituted aliphatic, cycloaliphatic or aromatic $C_1$–$C_{18}$ radical or a $C_7$–$C_{24}$ alkaryl or aralkyl radical, said radical optionally containing olefinic double bonds and hetero atoms, n is an integer of 1 to 4 according to the bonding of X, $R^3$ and $R^4$ may be the same or different and represent $C_1$–$C_9$ aliphatic, $C_5$–$C_6$ cycloaliphatic and $C_7$–$C_9$ aralkyl or $C_6$–$C_{10}$ aryl radicals, Y is S or $HCR^5$ where $R^5$ = H, $C_1$–$C_6$ alkyl, cyclohexenyl or cyclohexyl.

2. Stabilised polycarbonate corresponding to claim 1 containing as the polycarbonate a block-copolymer of blocks of polymerised aliphatic carbonates and blocks of polymerised vinyl compounds.

3. Stabilised polycarbonates according to claim 1 containing as the polycarbonate a sequentially structured copolymer of a cyclic aliphatic carbonate and an ester.

4. Aliphatic polycarbonates as claimed in claim 1 additionally containing an antioxidant.

5. Aliphatic polycarbonates as claimed in claim 1 wherein X is O, S or a non-basic nitrogen.

* * * * *